(12) United States Patent
Gipson et al.

(10) Patent No.: US 8,454,057 B2
(45) Date of Patent: Jun. 4, 2013

(54) THREADED END CONNECTOR ATTACHMENT FOR AN END OF A TUBE

(75) Inventors: Tommie C. Gipson, Eaton, CO (US); Larry R. Russell, Houston, TX (US)

(73) Assignee: RRI Holdings, Inc., Dallas, TX (US)

( * ) Notice: Subject to any disclaimer, the term of this patent is extended or adjusted under 35 U.S.C. 154(b) by 26 days.

(21) Appl. No.: 13/373,060

(22) Filed: Nov. 3, 2011

(65) Prior Publication Data

US 2013/0076025 A1    Mar. 28, 2013

Related U.S. Application Data

(60) Provisional application No. 61/626,449, filed on Sep. 27, 2011.

(51) Int. Cl.
*F16L 13/02* (2006.01)

(52) U.S. Cl.
USPC ............... 285/288.1; 285/288.6; 285/294.1; 285/330

(58) Field of Classification Search
USPC ......... 285/24, 27, 285.1, 286.1, 288.1–288.2, 285/288.5–288.6, 288.9, 294.1, 330, 397
See application file for complete search history.

(56) References Cited

U.S. PATENT DOCUMENTS

| | | | | |
|---|---|---|---|---|
| 1,870,771 | A | * | 8/1932 | De Witt ..................... 285/288.2 |
| 2,082,584 | A | * | 6/1937 | Magis ....................... 285/123.15 |
| 2,152,076 | A | * | 3/1939 | Menough ..................... 432/246 |
| 4,660,863 | A | * | 4/1987 | Bailey et al. ................ 285/123.6 |

* cited by examiner

*Primary Examiner* — Aaron Dunwoody
*Assistant Examiner* — Fannie Kee
(74) *Attorney, Agent, or Firm* — Elizabeth R. Hall

(57) ABSTRACT

A threaded tubing end assembly having a tubing with a transverse first end, a tubing through bore, and a longitudinal weld seam; a threaded adapter having an adapter through bore, and an adapter body having a threaded first end having a male thread and an opposed second end with an external transverse shoulder surrounding a reduced diameter elongated shank with an external longitudinal slot; a circumferential weld; and a longitudinal weld.

12 Claims, 3 Drawing Sheets

THREADED END CONNECTOR ATTACHMENT FOR AN END OF A TUBE

CROSS-REFERENCE TO RELATED APPLICATION

The present application, pursuant to 35 U.S.C. 111(b), claims the benefit of the earlier filing date of provisional application Ser. No. 61/626,449 filed Sep. 27, 2011, and entitled "Means of Attachment of a Threaded End Connector to an End of a Tubing."

BACKGROUND OF THE INVENTION

1. Field of the Invention

The present invention relates to a device and method for attaching a threaded end connector to the end of a tube. More particularly, the invention relates to a device and method for attaching a threaded end connector to the end of a coiled tubing string so that it can connect to a variety of drillstring components.

2. Description of the Related Art

Coiled tubing offers a rapid and cost effective way to deploy and retrieve tools used in well drilling and servicing. Previously, the attachment of such tools or threaded adapters to the bottom end of a coiled tubing string has utilized either mechanical means or simple annular welds. Annular fillet or butt welds between the tubing and a tool or threaded adapter are difficult to reliably produce and can be subject to fatigue from bending. Allowable fillet weld sizes for connecting tubing to adapters are insufficient to develop the full axial and torsional strengths needed of the tubing.

One commercially available mechanical connection means, the External Dimple Connector, sold by Weatherford International Ltd., is engaged over the coiled tubing with a close slip fit and uses elastomeric seal rings to seal the annular gap. Multiple radially oriented grub screws, positioned in a regularly spaced pattern in the annular external wall of the Weatherford connector, move inwardly to plastically deform the tubing wall to create sufficient interlocking to provide the desired axial and torsional load capacity. However, this design can be ineffective if the elastomeric seals are damaged or deteriorate. An additional weakness of this type of connector can result if the grub screws are screwed in too little, resulting in an inadequate load capacity.

Weatherford International Ltd. also offers an Internal Dimple Connector. That connector also uses elastomeric seals to seal the annular gap between the tubing bore and the connector. The Internal Dimple Connector has multiple external semispherical pits into which a separate tool is used to plastically deform the tubing wall into each of the pits in response to radially inward thrusts applied by individual spherical ended screws. This type of connector also is sensitive to seal damage or deterioration. Because coiled tubing is typically formed with an internally protruding weld bead parallel to the tube axis, there is a likelihood of damage to the annular seals from contact with the weld bead, even if the tubing bore is reamed.

A third type of threaded adapter is the Coil Tubing Connector TT0740-375 from Thru-Tubing Technology. This connector also uses elastomeric seals to seal the annular gap between the tubing exterior and the connector bore. The connector consists primarily of two tubular bodies which are joined by a threaded connection. Axial and torsional gripping is provided by engagement of a deformable internally toothed, externally tapered annular slip retained in a frustroconical pocket of a first half of the connector. The second half of the connector abuts the lower end of the slip. Tightening the threaded connection between the first and second halves of the connector causes the slip to be axially compressed into the frustroconical pocket so that it is forced radially inwardly into engagement with the tubing. Radial set screws are used to prevent backing off of the threaded connection between the two halves of the connector. High friction in the threaded interconnection of the two connector halves can lead to inadequate axial capacity, and the elastomeric seals are subject to installation damage and deterioration.

A need exists for additional tubing connectors which can offer high axial and torsional strength along with reliable sealing between the connector and the tubing to which it is mounted.

SUMMARY OF THE INVENTION

The present invention relates to a device and method for attaching a threaded end connector to the end of a tube. More particularly, the invention relates to a device and method for attaching a threaded end connector to the end of a coiled tubing string so that it can connect to a variety of drillstring components.

One embodiment of the present invention includes a threaded tubing end assembly comprising: a) a tubing having a transverse first end, a tubing through bore, a weld seam internally extending into the tubing through bore, and a through slot extending axially from the first end to a predetermined length, wherein the through slot is located in a side of the tubing opposite the weld seam; b) a threaded adapter having an adapter through bore, and an adapter body having a threaded first end, and an opposed second end with an external transverse shoulder surrounding a reduced diameter elongated shank extending from the second end, wherein the elongated shank has an external longitudinal slot sized to accommodate the internally extending weld seam of the tubing; c) a circumferential weld sealingly connecting the first end of the tubing to the transverse external shoulder of the threaded adapter, when the tubing through bore is positioned around the shank of the adapter so that the first end of the tubing abuts the transverse external shoulder of the adapter and the tubing weld seam is accommodated in the longitudinal slot of the adapter; and d) a longitudinal weld filling the axially extending through slot of the tubing and providing a structural connection between the tubing and the elongated shank.

A second embodiment of the present invention includes a threaded tubing end assembly comprising: a) a tubing having (i) a transverse first end with an internal chamfer, (ii) a tubing through bore, (iii) a weld seam internally extending into the tubing through bore, and (iv) a through slot extending axially from the first end of the tubing to a predetermined length, wherein the through slot is located in a side of the tubing opposite the weld seam; b) a threaded adapter having (i) an adapter through bore, and (ii) an adapter body having a threaded first end with a first transverse external shoulder, an opposed second end having a second transverse external shoulder and a reduced diameter elongated shank attached to the second end, wherein the shank has an external longitudinal slot extending an entire length of the shank and sized to accommodate the internally extending weld seam of the tubing, and wherein the elongated shank has a substantially constant external diameter sized to be a close fit with the tubing through bore when the tubing weld seam is accommodated in the longitudinal slot; c) a circumferential weld sealingly connecting the first end of the tubing to the second transverse external shoulder of the adapter body, when the tubing through bore is positioned around the elongated shank of the adapter so that the first end of the tubing abuts the second transverse external shoulder of the adapter body and the tubing weld seam is accommodated in the longitudinal slot of the elongated shank; and d) a longitudinal weld filling the axially extending through slot of the tubing and providing a structural connection between the tubing and the elongated shank on a side of the shank opposite the longitudinal slot.

Another embodiment of the present invention includes a method for attaching a threaded adapter to a tube comprising the steps of: (a) cutting a through slot through a first side of a tube opposite a weld bead that protrudes into a through bore of the tube, wherein the through slot axially extends from a transverse end of the tube for a predetermined length; (b) aligning the tube weld bead with an external longitudinal slot that extends along one side of an elongated shank of a threaded adapter; (c) sliding the transverse end of the tube over the elongated shank of the threaded adapter so that the transverse end of the tube abuts a transverse shoulder of the threaded adapter and the tube weld bead is positioned within the shank longitudinal slot, wherein the transverse shoulder surrounds an interior end of the elongated shank; (d) connecting the transverse end of the tube to the transverse shoulder of the adapter with a circumferential weld; and (e) connecting the shank of the threaded adapter to a side of the tube opposite the tube weld bead with a longitudinal weld filling the axially extending through slot.

Yet another embodiment of the present invention includes a method for attaching a threaded adapter to a tube comprising the steps of: (a) obtaining a threaded adapter having an adapter through bore, and an adapter body having a threaded first end, an opposed second end with a reduced diameter elongated shank attached to the second end and a transverse external shoulder surrounding the shank on the second end, wherein the shank has an external longitudinal slot extending a length of the shank; (b) preparing an outer tubing end of a coiled tubing string by providing a transverse end of the outer tubing end and cutting an axially extending through slot for a predetermined length through a first side of the outer tubing end opposite a weld bead that protrudes into a through bore of the coiled tubing; (b) aligning the tube weld bead with the external longitudinal slot that extends along one side of the elongated shank of the threaded adapter; (c) sliding a tubing through bore along the length of the elongated shank of the threaded adapter so that the transverse end of the tubing abuts the transverse shoulder of the threaded adapter and the tube weld bead is positioned within the shank longitudinal slot; (d) connecting the transverse end of the tube to the transverse shoulder of the adapter with a circumferential weld; and (e) connecting the shank of the threaded adapter to a side of the tube opposite the tube weld bead with a longitudinal weld filling the axially extending through slot.

The foregoing has outlined rather broadly several aspects of the present invention in order that the detailed description of the invention that follows may be better understood and thus is not intended to narrow or limit in any manner the appended claims which define the invention. Additional features and advantages of the invention will be described hereinafter which form the subject of the claims of the invention. It should be appreciated by those skilled in the art that the conception and the specific embodiment disclosed may be readily utilized as a basis for modifying or designing of the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The materials of the present invention typically are high strength low alloy carbon steels, such as AISI 4130 for the threaded portion of the threaded end fitting. The coiled tubing typically will have a yield strength of approximately 80,000 psi. The weld metal will be selected to be compatible with both the threaded end fitting and the coiled tubing. In service, the threaded end fittings of the present invention normally will be located on the lower end of the coiled tubing string. When describing orientations of the components of the present invention, it is assumed herein that "upward" is on the tubing side of the tubing to adapter connection, while "downward" is on the adapter side of the connection.

First Embodiment

Figure 1:
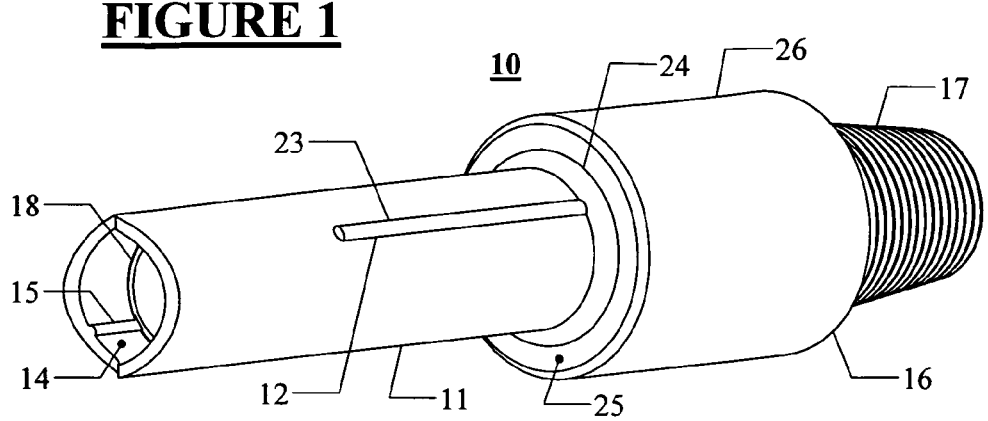
FIG. 1 is an oblique view of the first embodiment of the present invention, wherein a connector with a male distal thread at a first end is welded at its second end to one end of a coiled tubing string.

Referring to FIG. 1, a first embodiment 10 of the present invention is seen in an oblique view. The male threaded end adapter assembly 10 consists of a prepared coiled tubing end 11, a male threaded end fitting 16, a longitudinal weld 23, and a circumferential weld 24.

Figure 2:
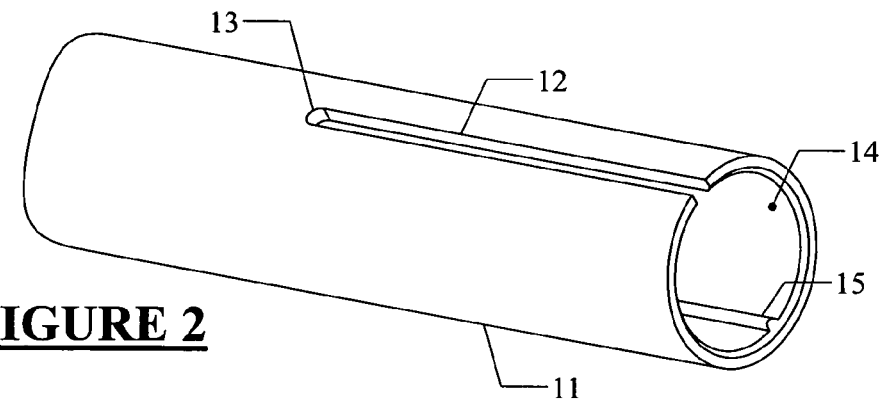
FIG. 2 is an oblique view of the end of the coiled tubing string which is to be joined to the threaded connector of FIG. 1, wherein the tubing end is provided with an elongated through slot parallel to the axis of the tubing. The slot serves as a weld preparation for making the connection of the tube to the threaded end connector.

The tubing end 11, shown joined to the end fitting 16 in FIG. 1 and by itself in FIG. 2, typically has a relatively thin wall and a substantially circular cross-section. The lower tubing end 11 is preprepared for attachment to the male end adapter 10 by: (a) squaring the lower end of the tubing end 11, (b) cutting a long narrow through slot 12 of a predetermined length with parallel sides and a rounded end 13 parallel to the tube axis from the transverse lower tubing end, and (c) providing an internal end chamfer sufficiently large that end abutment is ensured between the lower tubing transverse end and a transverse external shoulder 25 of the male threaded end fitting 16 or a female threaded end fitting 30. The internal chamfer ensures that a sound circumferential fillet seal weld 24 can be made between the abutted parts.

The manufacture of coiled tubing generally includes bending a metal strip about an axis parallel to its longitudinal axis so that it has a circular cross-section. The abutting edges of the rounded metal strip are then welded with a longitudinal weld seam to connect the two adjacent edges of the rounded metal strip. The longitudinal weld generally leaves an inwardly extending longitudinal weld bead 15 along the length of the tubing. Thus, the interior cylindrical surface 14 of the tubing end 11 will typically exhibit the inwardly extending longitudinal seam weld bead 15. Although the size and shape of the longitudinal seam weld bead will vary, it generally has an arcuate surface projecting inwardly, that is relatively narrow and has a width approximately equal to or less than the thickness of the tubing. The inward projection of the weld bead 15 is typically about half of its width in the circumferential direction.

Figure 3:
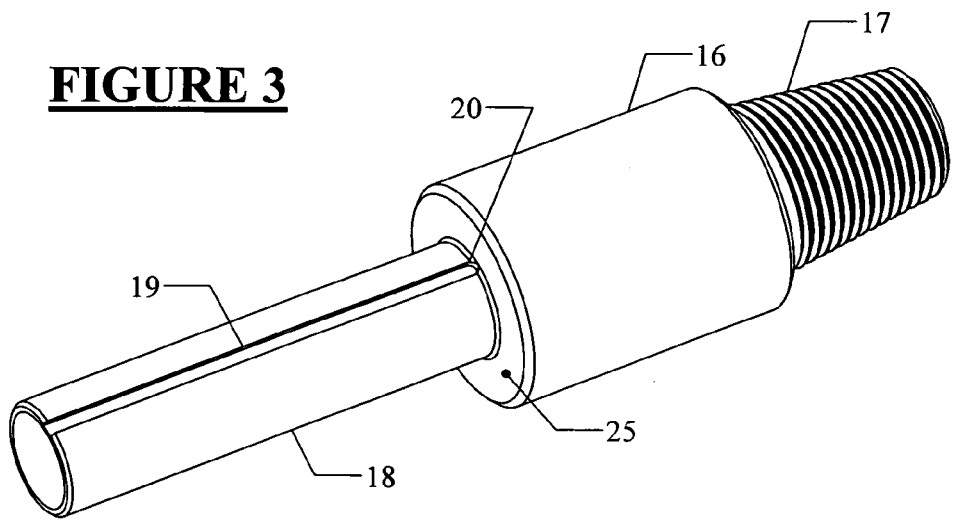
FIG. 3 is an oblique view of the male threaded end connector of the first embodiment of the present invention, wherein the connector has a male distal thread at a first end and is configured to be welded to a coiled tubing at its second end.

FIG. 3 is an oblique view which shows the male threaded end adapter 16. From its lower end, the exterior of the male threaded end adapter 16 has an external tapered male thread 17, a downwardly facing external transverse sealing shoulder, an enlarged cylindrical main body 26, a transverse upwardly facing shoulder 25, and a constant diameter elongated shank 18. Adapter 16 has a coaxial through bore 27 to permit fluid flow. The length of the elongated shank 18 will vary but should be at least as long as or longer than the slot 12 in the prepared tubing end 11. Typically, the length of shank 18 is on the order of two to four times the diameter of the tubing end 11. The shank 18 is made to have a close slip fit to the through bore of the tubing end 11 when interference with the interior longitudinal weld bead 15 is avoided by engagement of the weld bead 15 in the longitudinal slot 19 in the shank 18.

The male thread 16 is selected to be compatible with comatable drillstring components, such as downhole motors and the like. The connection of the male threaded adapter 16 to any comatable drillstring components relies on an intimate compressive abutment between its downwardly facing external transverse sealing shoulder and a corresponding upwardly facing shoulder of a comating female connection.

In order to avoid excess stress concentration, a fillet weld is provided between the upwardly facing external transverse shoulder 25 and the shank 18 of adapter 16. The size of the fillet is slightly less than the internal chamfer at the end of the tubing 11. The elongated shank 18 of end adapter 16 has an external slot 19 parallel to its axis extending from its upper end to adjacent the upwardly facing external transverse shoulder 25 of the adapter 16. Slot 19 has a width and depth sufficient to readily accommodate the internal weld bead of the tubing without interference and also has a rounded internal end 20 adjacent shoulder 25.

Figure 8:
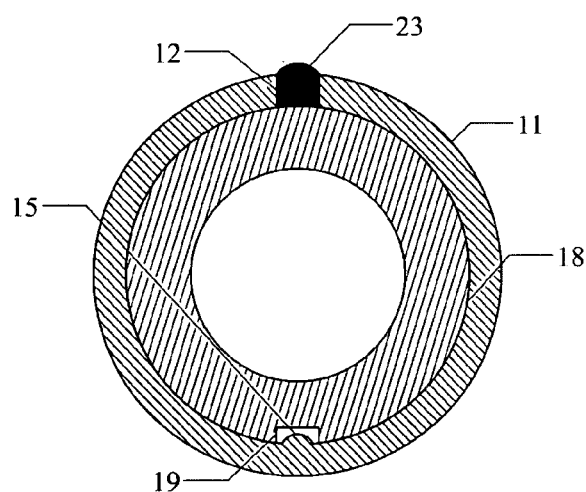
FIG. 8 is a transverse sectional view of the longitudinal weld connecting the tubing and the male threaded end connector of FIG. 4.

The connection of the tubing 11 and the male threaded end adapter 16 is made by first aligning the internal weld bead 15 of the prepared tubing end 11 with the slot 19 in the shaft 18 of the end adapter 16, then inserting the end adapter 16 into the tubing end 11 until the lower end of the tubing end 11 abuts the upwardly facing shoulder 25 of the threaded end adapter. When this action is complete, the internal weld bead 15 of the tubing is contained within the slot 19, as seen in FIG. 8, and at least partially anchored against axial movement.

Since tubing slot 12 is opposed to the longitudinal weld seam 15, when the slot 19 of the shank 18 contains the weld bead 15, the tubing slot 12 is on the opposite side of the tubing end 11 from the shank contained weld bead. The slot 12 is then completely filled by weld 23 so that a sealing structural connection is produced between the tubing end 11 and the adapter 16. The weld 23 is made so that its outer surface is convex. Weld 23 is readily made and provides substantial axial and torsional strength to the joint between tubing 11 and adapter 16.

Following the making of weld 23, a circumferential fillet weld 24 is made at the abutted junction of the end of the tubing 11 and the upwardly facing transverse shoulder 25 of the adapter 16. While the circumferential fillet weld 24 does contribute both axial tension and torsion capacity to the connection between the tubing 11 and the adapter 16, the primary requirement for the circumferential weld is that it completely seal between the two parts. The sizing of the two welds 23 and 24 is such that they possess a combined torsional and axial tension resistance greater than both the axial strength and the torsional strength of the coiled tubing. The interconnection of the tubing end 11 and the male threaded adapter 16 is fully sealed against leakage.

Second Embodiment

Figure 4:
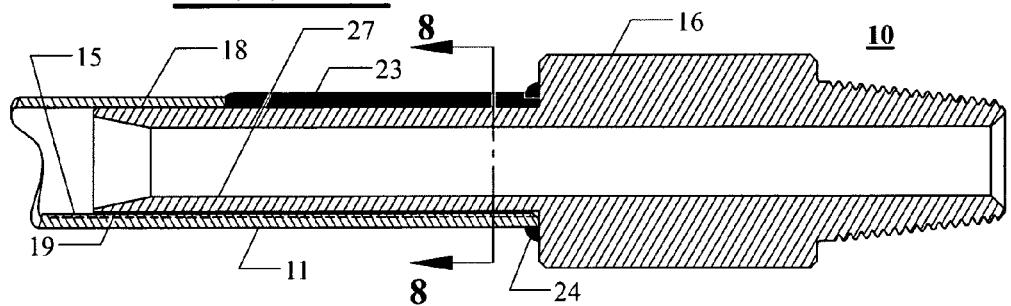
FIG. 4 is a longitudinal sectional view of the cojoined threaded male end connector and tubing end of FIG. 1, wherein the section is taken through the aligned and welded slots of the joined parts.
Figure 5:
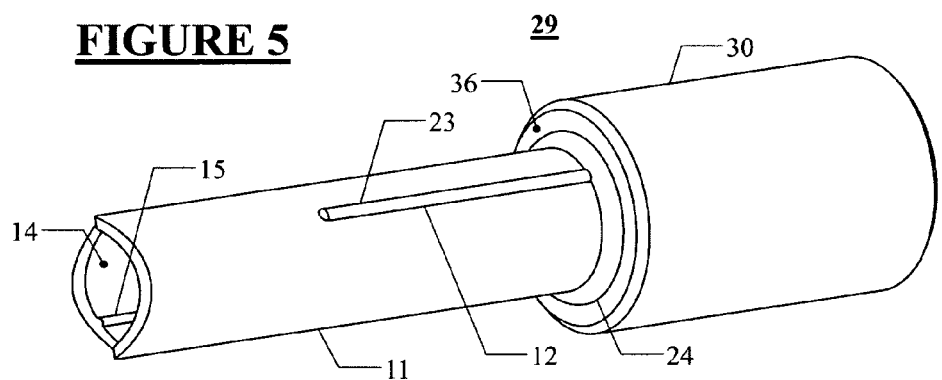
FIG. 5 is an oblique view of a second embodiment of the female threaded end connector attached to an end of a coiled tubing.

The female thread adapter assembly 29, shown in FIG. 4, of the second embodiment of the present invention is identical to the first embodiment 10 in all respects except that the female threaded adapter 30 has an internal tapered female thread 31, rather than the male tapered thread 17 of the male threaded end fitting 16. Both male and female threads are frequently used for connections in oilfield downhole tools.

Figure 6:
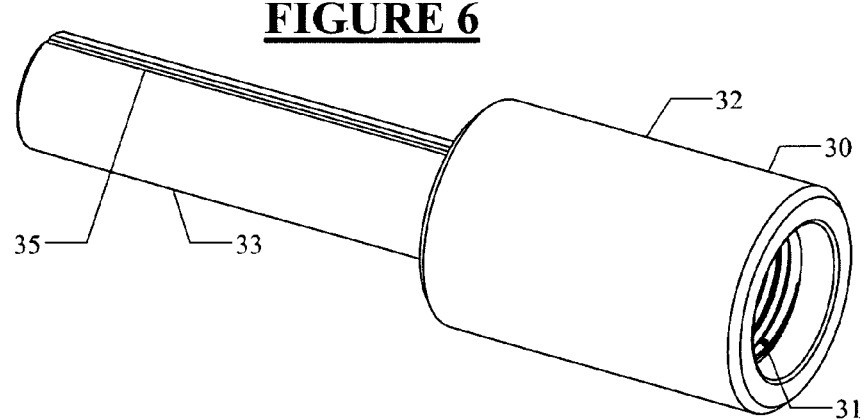
FIG. 6 is an oblique view of the female threaded end connector of the second embodiment.
Figure 7:
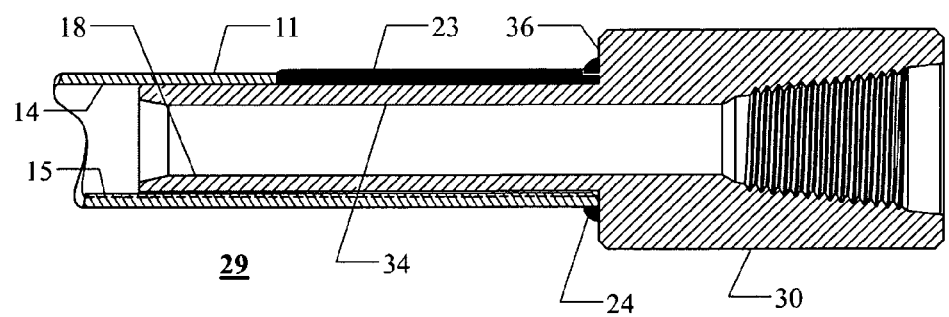
FIG. 7 is a longitudinal sectional view of the cojoined threaded female end connector and tubing end of FIG. 5, wherein the section is taken through the aligned and welded slots of the joined parts.

The same prepared tubing end 11 is used for both embodiments of the present invention. From its lower end, the exterior of the female threaded end adapter 30, shown in FIG. 6, has a downwardly facing external transverse sealing shoulder, an enlarged cylindrical main body 32, a transverse upwardly facing shoulder 36, and a reduced constant diameter elongated shank 33. The shank 33 has a close slip fit to the through bore of the tubing 11 when interference with the interior longitudinal weld seam 15 is avoided.

Threaded adapter 30 has a coaxial through bore 34 to permit fluid flow and an internal tapered female thread 31 at its lower end. The length of the elongated shank 33 is somewhat more than that of the slot 12 in the prepared tubing end 11. Typically, the length of shank 33 is on the order of two to four times the diameter of the tubing 11.

The female thread 31 is selected to be compatible with comatable drillstring components, such as downhole motors and the like. The connection of female thread adapter assembly 29 to any comatable drillstring components relies on an intimate compressive abutment between the downwardly facing external transverse sealing shoulder of adapter 30 and a corresponding upwardly facing shoulder of a comating male connection.

In order to avoid excess stress concentration, a fillet is provided between the upwardly facing external transverse shoulder 36 and the shank 33 of adapter 30. The size of the fillet is slightly less than the internal chamfer at the lower end of the tubing end 11. The elongated shank 33 of end adapter 30 has an external slot 35 parallel to its axis extending from its upper end to adjacent the upwardly facing external transverse shoulder 36 of the adapter 30. Slot 35 has a width and depth to readily accommodate the internal weld bead 15 of the tubing 11 without interference and also has a rounded internal end 20 adjacent shoulder 36.

The connection procedures for the female threaded adapter assembly 29 and the interconnection of the tubing end 11 and the female threaded adapter 30 are identical to those used for the male thread adapter assembly 10. The connection of the tubing 11 and the female threaded end fitting 29 is made by first aligning the internal weld bead 15 of the tubing with the slot 35 of the end adapter 30, then inserting the female threaded adapter 30 until the end of the tubing abuts the upwardly facing shoulder 36 of the adapter. Following this, tubing slot 12 is completely filled by welding so that a sealing structural connection is produced between the tubing 11 and the adapter 30. The longitudinal weld 23 is made so that its outer surface is convex and extends slightly above the outer cylindrical surface of the tubing 11.

Following the making of weld 23, a circumferential fillet seal weld 24 is made at the junction of the end of the tubing 11 and the upwardly facing transverse shoulder 36 of the adapter 30. The sizing of the two welds 23 and 24 is such that they possess a combined torsional and axial tension resistance greater than both the combined axial strength and the torsional strength of the tubing 11.

The transverse sectional view of FIG. 8 illustrates the connection of the male adapter assembly 10 to the tubing end 11, but it can equally apply to the female threaded adapter assembly 29 if the external slot 35 in its elongated shank 33 is substituted for the corresponding items in the male threaded adapter 16.

Operation of the Invention

The threaded adapter assemblies 10 and 29 of the present invention basically are passive devices to which various comatably threaded devices are attached in order to enable various operations to be performed downhole in a well. The threaded connections between adapter assemblies 10 and 29 are made by fixedly gripping the outer cylindrical bodies 26 or 32 and then engaging appropriately threaded comating tools into full engagement at a predetermined torque. Releasing a threaded connection is done by firmly gripping the outer cylindrical bodies and applying sufficient torque to separate the connection.

When a tool or device is deployed into a well on the lower end of a coiled tubing string which has attached one of the threaded adapter assemblies of the present invention, relatively high tension loads may have to be applied to the threaded adapter in order to free pipe that has been stuck in the well. Also, the threaded adapter may be subject to torsion loads during downhole operations. In such cases, the welds of the adapters readily provide tension and torsion capacities for the adapter assemblies equal to or greater than a simple fillet, butt, or groove weld can provide. The additional strength capacities provided by the addition of the longitudinal weld 23 also assist in avoidance of structural fatigue problems for the connections.

Advantages of the Invention

The present invention permits the easy and reliable interconnection of the threaded end adapters to the outer end of a coiled tubing string so that the connection has both axial and torsional strength equal to or in excess of the strength of the tubing. Equivalent structural strength capacity is difficult or impossible to obtain reliably with only a single circumferential fillet weld or groove weld or butt weld.

Inserting the shanks of the threaded end adapters into the tubing bore is simple and does not require vigorous hammering or otherwise forcing of the end adapters. The connecting welds are easy to make with conventional equipment, easily visually inspected, and can be made sufficiently strong and reliable to ensure reliable and fatigue resistant connections. Also, weld inspection is simple.

The fabrication of the threaded adapters is simple and economical, and tubing end preparation does not require reaming or scarfing to remove the inwardly protruding seam weld. Reaming the tubing is difficult because of variations in tubing bore size and ovality, as well as being difficult to inspect. The tubing diameter tends to open up slightly when a longitudinal slot is cut through its wall, which further eases the installation of the adapter shank into the tubing bore.

The above advantages result in a more reliable connection means which is less expensive, readily installed, and robust.

Although the present invention has been described in detail, it should be understood that various changes, substitutions and alterations can be made herein without departing from the spirit and scope of the invention as defined by the appended claims. As may be understood readily by those skilled in the art, certain variations in the structure of the present invention may be made without departing from the spirit of the invention. For instance, the shape and dimensions of the component parts of the threaded adapters can be varied. These and other minor changes can be made without departing from the spirit of the invention.

What is claimed is:

1. A threaded tubing end assembly comprising:
   a) a tubing having
      a transverse first end,
      a tubing through bore,
      a longitudinal weld seam internally extending into the tubing through bore, and
      a through slot extending axially from the first end to a length,
      wherein the through slot is located in a side of the tubing opposed to the weld seam;
   b) a threaded adapter having
      an adapter through bore, and
      an adapter body having
         a threaded first end having a male thread, and
         an opposed second end with an external transverse shoulder surrounding a reduced diameter elongated shank extending from the second end, wherein the elongated shank has an external longitudinal slot sized to accommodate the internally extending weld seam of the tubing;
   c) a circumferential weld sealingly connecting the first end of the tubing to the transverse external shoulder of the threaded adapter, when the tubing through bore is positioned around the shank of the adapter so that the first end of the tubing abuts the transverse external shoulder of the adapter and the tubing weld seam is accommodated in the longitudinal slot of the adapter; and
   d) a longitudinal weld filling the axially extending through slot of the tubing and providing a structural connection between the tubing and the elongated shank.

2. The threaded tubing end assembly of claim 1, wherein the longitudinal slot extends an entire length of the elongated shank.

3. The threaded tubing end assembly of claim 1, wherein the elongated shank is substantially circular with a substantially constant external diameter.

4. The threaded tubing end assembly of claim 3, wherein the external diameter of the elongated shank is a close fit to the tubing through bore when the tubing weld seam is accommodated in the longitudinal slot of the threaded adapter.

5. The threaded tubing end assembly of claim 1, wherein the transverse first end of the tubing has an internal chamfer.

6. The threaded tubing end assembly of claim 1, wherein the elongated shank is welded to the second end of the adapter body.

7. The threaded tubing end assembly of claim 1, wherein a length of the elongated shank is from about two to four times an internal diameter of the tubing.

8. The threaded tubing end assembly of claim 1, wherein the tubing through slot is shorter than the elongated shank.

9. The threaded tubing end assembly of claim 1, wherein the threaded first end of the adapter body is surrounded by an externally facing transverse sealing shoulder.

10. A threaded tubing end assembly comprising:
   a) a tubing having
      (i) a transverse first end with an internal chamfer,
      (ii) a tubing through bore,
      (iii) a weld seam internally extending into the tubing through bore, and
      (iv) a through slot extending axially from the first end of the tubing to a length, wherein the through slot is located in a side of the tubing opposite the weld seam;
   b) a threaded adapter having
      (i) an adapter through bore, and
      (ii) an adapter body having
         a threaded first end having a male thread and a first transverse external shoulder,
         an opposed second end having a second transverse external shoulder and a reduced diameter elongated shank attached to the second end, wherein the shank has an external longitudinal slot extending an entire length of the shank and sized to accommodate the internally extending weld seam of the tubing, and wherein the elongated shank has a substantially constant external diameter sized to be a close fit with the tubing through bore when the tubing weld seam is accommodated in the longitudinal slot;
   c) a circumferential weld sealingly connecting the first end of the tubing to the second transverse external shoulder of the adapter body, when the tubing through bore is positioned around the elongated shank of the adapter so that the first end of the tubing abuts the second transverse external shoulder of the adapter body and the tubing weld seam is accommodated in the longitudinal slot of the elongated shank; and
   d) a longitudinal weld filling the axially extending through slot of the tubing and providing a structural connection between the tubing and the elongated shank on a side of the shank opposite the longitudinal slot.

11. The threaded tubing end assembly of claim 10, wherein a length of the elongated shank is from about two to four times an internal diameter of the tubing.

12. The threaded tubing end assembly of claim 10, wherein the tubing through slot is shorter than the elongated shank of the threaded adapter.

\* \* \* \* \*